Nov. 20, 1962 R. E. NEMECEK ET AL 3,064,751
POWER STEERING LINKAGE WITH UNIVERSAL JOINT
Filed May 2, 1960 3 Sheets-Sheet 1

INVENTORS
Ralph E. Nemecek &
BY John A. Walko
ATTORNEY

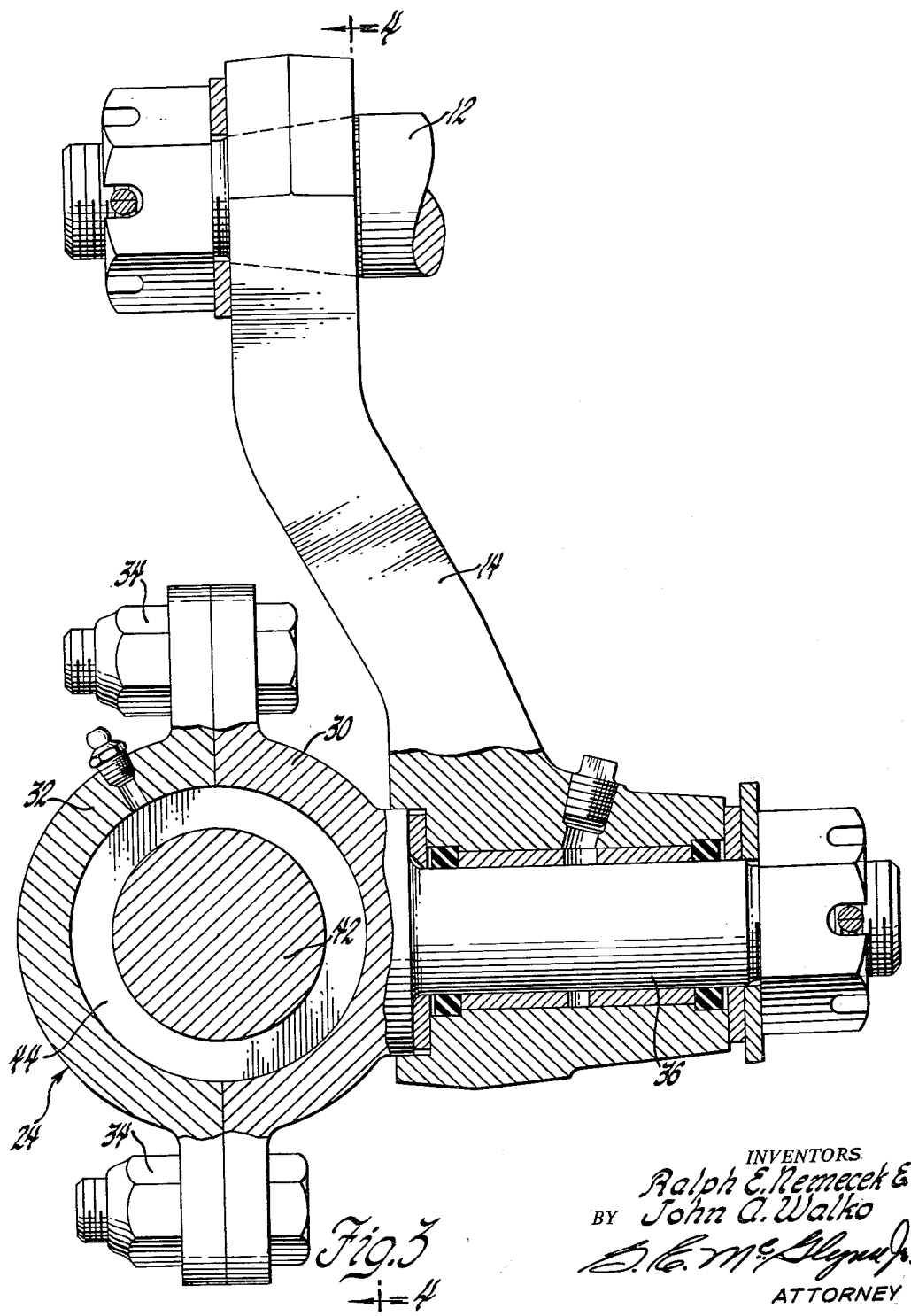

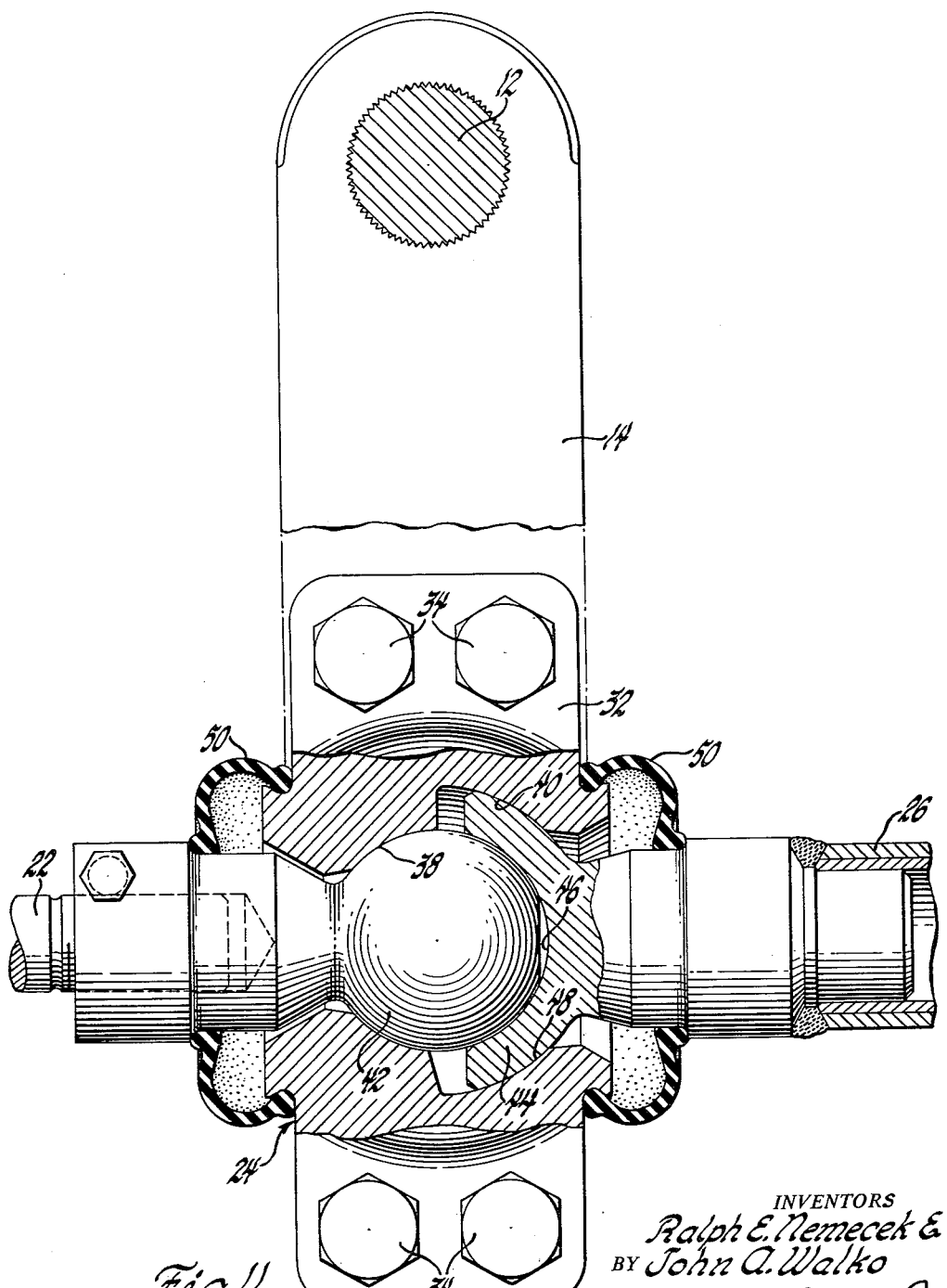

3,064,751
Patented Nov. 20, 1962

---

3,064,751
POWER STEERING LINKAGE WITH
UNIVERSAL JOINT
Ralph E. Nemecek, Lyndhurst, and John A. Walko, Cleveland, Ohio, assignors to General Motors Corporation, Detroit, Mich., a corporation of Delaware
Filed May 2, 1960, Ser. No. 26,260
5 Claims. (Cl. 180—79.2)

This invention pertains to automotive vehicle steering linkages and, in particular, to booster steering linkages of the type commonly employed with large heavy duty off-the-road earth-moving vehicles.

Vehicles of the type aforementioned are, of course, quite large and require some type of power or booster steering linkage to assist the driver in steering the dirigible wheels. Such vehicles are equipped with conventional steering gears including a pitman arm to which a drag link has one end pivotally connected with the other end operatively pivotally connected to the steering knuckle or wheels to be steered. To augment the manual effort applied by the vehicle operator in steering the wheels, booster motors are provided having one end pivotally connected to a portion of the vehicle frame and the other end pivotally connected to the pitman arm of the steering gear. Suitable valving is provided so that, in response to manual steering effort on the steering wheel, fluid under pressure is supplied to the booster motor or motors to assist in stroking the pitman arm to steer the vehicle.

In the prior art steering linkages of the type aforementioned, the respective pivotal connections of the booster motor and drag link to the steering gear pitman arm have been at spaced points on the latter. However, the location and spacing of these pivotal connections are problematical, and more often than not require a compromise among various parameters such as the range of steering action desired, mechanical advantages to be gained by the respective connections to the pitman arm, power and stroke of the booster motor, and available space and clearances for the steering linkage and its components.

For example, it is obviously desirable to locate the drag link on the pitman arm as close as possible to the pivot point of the latter inasmuch as such a location will reduce to a minimum the amount of manual force required to sweep or stroke the pitman arm against the load imposed thereon. However, there is a limitation as to how close the drag link can be located to the pitman arm pivot dictated primarily by the amount of stroke needed to steer the wheels. Similar considerations obtain in locating the pivotal connection of the booster motor to the pitman arm. The ideal location for the booster motor is below the drag link pivot, thereby enabling the use of a smaller or less powerful jack to move the link; however, locating the booster connection below that of the drag link may result in a jack which is too long for the clearances or space involved. This problem may be solved, assuming there is sufficient clearance, by mounting the booster jack above the drag link pivot point on the pitman arm thereby enabling the use of a shorter jack. However, the jack will then have to be larger in capacity or more powerful to overcome the larger forces encountered. Consideration of the factors set forth above lead to a compromise in the location of the pivotal connections of the motor and drag link to the pitman arm. Even after the aforementioned aspects of the problem are considered and compromised, there remains the problem of interference between the respective pivotal connections of the booster motor and drag link to the pitman arm. In other words, in any given design, the optimum compromise point for the pivotal connections of the motor and drag link to the pitman arm may be so close to each other that the motor and drag link will strike each other during the sweep or stroke of the pitman arm, thereby seriously limiting the range of steering movement of the vehicle wheels. In this regard, it is not acceptable to make the respective pivotal connections to the pitman arm on opposite sides of the latter inasmuch as seriously objectionable couples result.

It is, therefore, a principal object and feature of this invention to provide a booster steering linkage of the type aforementioned in which the booster motor and drag link may be connected to the same side of the pitman arm at a common joint, thereby giving greater flexibility in location of the connections of the motor and drag link to the pitman arm.

It is yet another object and feature of this invention to provide a joint of the type aforementioned which will permit the booster motor and drag link to pivot relative to each other and the pitman arm as the latter strokes during steering, thereby avoiding interference between the booster jack and drag link throughout the entire range of steering movement.

It is yet another object and feature of this invention to provide a universal joint connection between the pitman arm, booster motor and drag link which will permit these members to pivot relative to each other about a common center or axis.

In general, these and other objects of the invention are attained in a vehicle having dirigibly mounted steering wheels, a steering mechanism including a manually operable steering gear including a steering responsive pitman arm, a fluid pressure operated booster steering motor, a drag link, and an assembly joint for connecting the booster motor and drag link to the pitman arm for movement relative thereto and each other about a common center or axis. To this end, the aforementioned assembly joint comprises a spherical master socket suitably rotatably mounted on the depending end of the pitman arm, a spherical ball member confined within the socket and a spherical socket member confined with the master socket and engaging the ball member, the spherical bearing surfaces of the master socket, ball member and socket member being such that the ball and socket member may pivot reltaive to each other and the master socket about a common center substantially at the center of the ball member, or an axis or plurality of axes passing through said center. Either the ball member or the socket member may then be rigidly connected to the booster motor, while the other member is rigidly secured to the drag link. In addition to the relative pivotal movement aforedescribed, the master socket may rotate relative to the pitman arm on an axis substantially through the center of the ball member as further accommodation for the relative movement between the booster motor and drag link during the sweep or stroke of the pitman arm.

The nature of the invention and the manner in which the foregoing objectives are attained will become more apparent hereinafter from a consideration of the accompanying drawings in which:

FIGURE 3 is an enlarged view taken on line 3—3 of FIGURE 2; and

FIGURE 4 is a view taken on line 4—4 of FIGURE 3.

Figure 1:
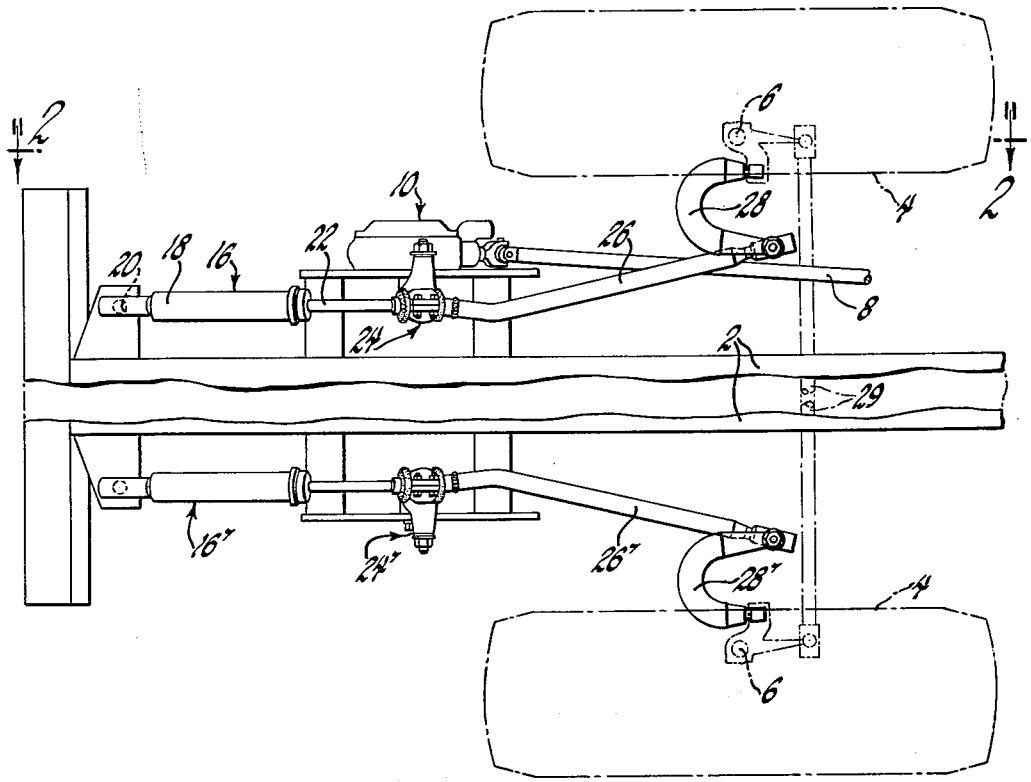
FIGURE 1 is a fragmentary plan view of the steering gear linkage of a heavy duty vehicle.
Figure 2:
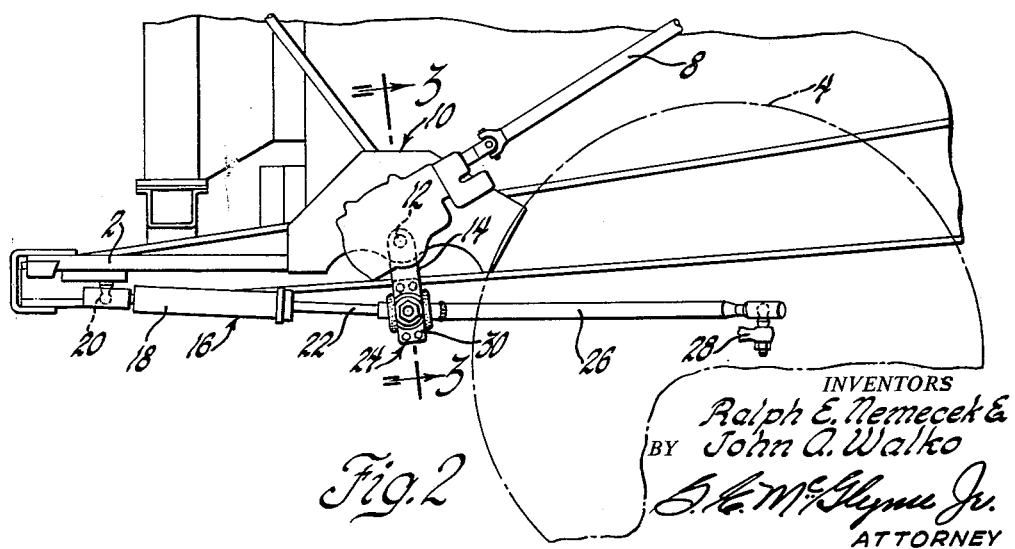
FIGURE 2 is a view taken on line 2—2 of FIGURE 1 showing the booster steering linkage associated with the steering gear.

Referring now to the drawings, FIGURE 1 thereof illustrates the steering linkage of a heavy duty vehicle, such as of the off-the-road type, comprising a vehicle frame 2 to which the laterally spaced dirigible front steering wheels 4 are connected in the usual manner for steering articulation about the vertical axes indicated at 6. A manually operable steering shaft 8 is adapted to be rotated by the vehicle operator within his cab to control the operation of the steering gear 10 which includes the steering pivot shaft 12 to which the depending pitman arm 14 is connected in the usual manner. A fluid pressure operated booster steering motor or jack is indicated at 16 and includes a cylinder 18 pivotally connected to the vehicle frame at 20, and a piston rod 22 extending thereout for connection at the joint indicated generally at 24. Similarly, a drag link 26 is connected in the joint 24, and has its rearwardly extending end pivotally connected to a steering knuckle or arm 28 for steering a wheel 4.

The booster steering linkage depicted on the other side of the vehicle in FIGURE 1 is, with one exception, identical to that previously described and is, therefore, identified by corresponding numerals, primed. The exception is that, on this other side of the vehicle, there is no steering gear corresponding to the gear 10; rather, an arm corresponding to the pitman arm 14 is pivotally mounted on frame 2 and acts as an idler. The tie rod 29 interconnects arms 28 and 28' in the usual manner.

In operation, manual rotation of the steering shaft 8 sweeps or strokes the pitman arm 14 while, through a suitable fluid system of the conventional type (not shown), the booster motors 16 and 16' are actuated in the proper direction to steer the wheels 4. In this regard, FIGURE 1 of the drawings depicts one type of system in which fluid is directed to two booster jacks; however, only one booster jack or motor 16 may be used as will be obvious.

Referring now particularly to FIGURES 3 and 4, the joints 24 and 24' may each be seen to consist of a half socket 30 to which another half socket 32 is secured as by the bolts 34 to form a master socket. A cylindrical spindle 36 is formed integral with the half socket 30 and, after bolting the half socket members together, is utilized to rotatably support the master socket within the depending free end of the pitman arm 14 and the corresponding idler arm.

The aforedescribed composite master socket structure is open at both ends and, adjacent one end, includes an annular spherical bearing surface 38 and, adjacent the other end thereof, a second annular spherical bearing surface 40 having a larger radius of curvature than the surface 38. A spherical ball member 42 is formed integral with a shank portion rigidly secured to the end of the piston rod 22. Sufficient clearance is provided between the neck of the ball stud and the interior surface of the master socket to insure that relative movement can occur therebetween to the extent required throughout the entire stroke of the pitman arm. In similar fashion the cap or socket member 44 is formed integral with or otherwise rigidly secured to a shank rigidly joined to the drag link 26. The cap or socket member 44 includes an annular internal spherical bearing surface 46 engaging the bearing surface of the ball member 42, and another external annular spherical bearing surface 48 engaging the master socket bearing surface 40. Again, the clearance between the cap or socket member 44 and the master socket construction is such to insure that the cap or socket member 44 can move freely within the socket and about the ball 42 to the extent required during the entire steering stroke of the pitman arm 14. Dust covers or seals 50 are secured about the open ends of the master socket and the shanks of ball and socket members 42 and 44 to prevent foreign materials from entering the interior of the master socket.

For the purpose of assembly and disassembly, it will be apparent that the cap or socket member 44 is slightly less than a complete hemisphere so as to be freely insertable upon and removable from the ball member 42. In installing the assembly, the ball member 42 and socket member 44 are placed in abutting engagement as shown, nested within the half member 30 and then the other member 32 bolted thereto to complete the assembly.

The radii of curvature of the ball member 42, bearing surfaces 38, 40, 46 and 48 are such that a common center of pivotal adjustment is established through the center of the ball member 42, or substantially thereat. As a matter of fact, relative universal adjustment of the master socket, ball member 42 and socket member 44 may occur about an axis or plurality of axes passing through the center of ball member 42. Inasmuch as the master socket and ball and socket members 42 and 44 pivot relative to each other about a common axis or center, and due to considerations set forth above, there is no interference between the ball member 42 and socket member 44 during the entire stroke of the pitman arm. To additionally accommodate the relative angling of the booster motor relative to the drag link, the entire master socket assembly may rotatably adjust about the axis of the spindle 36 which passes through the center of the ball member 42.

While but one form of the invention has been selected for a descriptive illustration thereof, other forms will be apparent to those skilled in the art. Therefore, the embodiment shown in the drawings is merely for illustrative purposes, and is not intended to limit the scope of the invention which is defined in the claims which follow.

We claim:
1. A universal assembly joint for interconnecting three members for universal adjustment relative to each other comprising a ball member, a socket member receiving said ball member, one of said ball and socket members being operatively connected to a first member and the other being operatively connected to a second member, a master socket receiving said ball and socket members whereby said ball and socket members and said master socket are universally adjustable relative to each other about substantially the center of said ball member, a spindle extending from said master socket, and means supporting said spindle on a third member for rotation about an axis passing substantially through the center of said ball member.

2. A universal assembly joint for interconnecting three members for universal adjustment relative to each other comprising a ball member, a socket member having an internal spherical bearing surface receiving a portion of said ball member and an external spherical bearing surface, one of said ball and socket members being operatively connected to a first member and the other being operatively connected to a second member, a master socket having a pair of spherical bearing surfaces respectively receiving another portion of said ball member and the external bearing surface of said socket member whereby said ball and socket members and said master socket are universally adjustable relative to each other about susbstantially the center of said ball member, a spindle extending from said master socket, and means supporting said spindle on a third member for rotation about an axis passing substantially through the center of said ball member.

3. An assembly joint for connecting a fluid pressure-operated steering motor and drag link of a vehicle steering linkage to the pitman arm of a manually-operable vehicle steering gear comprising a ball member, a socket member receiving said ball member, one of said ball and socket members being operatively connected to said motor and the other being operatively connected to said drag link, a master socket receiving said ball and socket members whereby said ball and socket members and said master socket are universally adjustable relative to each other about substantially the center of said ball member, a spindle extending from said master socket, and means supporting said spindle on said pitman arm for rotation about an axis passing substantially through the center of said ball member.

4. An assembly joint for connecting a fluid pressure-operated steering motor and drag link of a vehicle steering linkage to the pitman arm of a manually-operable vehicle steering gear comprising a ball member, a socket member having an internal spherical bearing surface receiving a portion of said ball member and an external spherical bearing surface, one of said ball and socket members being operatively connected to said motor and the other being operatively connected to said drag link, a master socket having a pair of spherical bearing surfaces respectively receiving another portion of said ball member and the external bearing surface of said socket member whereby said ball and socket members and said master socket are universally adjustable relative to each other about substantially the center of said ball member, a spindle extending from the master socket, and means supporting said spindle on said pitman arm for rotation about an axis passing substantially through the center of said ball member.

5. In a vehicle having dirigibly mounted steering wheels, a steering mechanism comprising a manually operable steering gear including a steering responsive pitman arm, a fluid pressure-operated steering motor having one end pivotally connected to said vehicle, a drag link having one end operatively pivotally connected to a wheel to be steered, an assembly joint connecting the other ends of said motor and link to said pitman arm; said joint comprising a ball member rigidly secured to the other end of said motor, a socket member rigidly secured to the other end of said link and having an internal spherical bearing surface receiving a portion of said ball member and an external spherical bearing surface, a master socket open at each of its ends, an internal spherical bearing surface at each end of said master socket, the radius of curvature of one of said master socket bearing surfaces being larger than that of the other of said surfaces, another portion of said ball member being received within the smaller of said master socket bearing surfaces and the external bearing surface of said socket member being received within the larger of said master socket bearing surfaces whereby said ball and socket members and said master socket are universally adjustable relative to each other about substantially the center of said ball member, and a spindle secured to said master socket and supported on said pitman arm for rotation about an axis passing substantially through the center of said ball member.

References Cited in the file of this patent
UNITED STATES PATENTS

| | | |
|---|---|---|
| 2,022,698 | Vickers | Dec. 3, 1935 |
| 2,459,731 | Wymore | Jan. 18, 1949 |
| 2,614,862 | Alldredge et al. | Oct. 21, 1952 |
| 2,746,557 | Augustin | May 22, 1956 |